US011802078B2

(12) United States Patent
Voronov et al.

(10) Patent No.: US 11,802,078 B2
(45) Date of Patent: Oct. 31, 2023

(54) GLASS AND METHOD OF MANUFACTURING THE SAME

(71) Applicant: Samsung Display Co., Ltd., Yongin-Si (KR)

(72) Inventors: Alexander Voronov, Suwon-si (KR); Hyungsik Kim, Suwon-si (KR); Sunggyu Park, Hwaseong-si (KR); Junghwa You, Hwaseong-si (KR); Joongsung Lee, Hwaseong-si (KR); Woohyun Jung, Seoul (KR); Gyoowan Han, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/529,736

(22) Filed: Nov. 18, 2021

(65) Prior Publication Data

US 2022/0162117 A1    May 26, 2022

(30) Foreign Application Priority Data

Nov. 23, 2020 (KR) ......................... 10-2020-0157805

(51) Int. Cl.
*C03C 15/00* (2006.01)
*C03C 17/00* (2006.01)
*C03C 23/00* (2006.01)

(52) U.S. Cl.
CPC ............ *C03C 15/00* (2013.01); *C03C 17/002* (2013.01); *C03C 23/0025* (2013.01); *C03C 2218/328* (2013.01); *C03C 2218/355* (2013.01)

(58) Field of Classification Search
CPC . C03C 15/00; C03C 17/002; C03C 2218/328; C03C 2218/355
See application file for complete search history.

(56) References Cited

U.S. PATENT DOCUMENTS

| 9,346,706 B2 | 5/2016 | Bazemore et al. |
| 9,850,160 B2 | 12/2017 | Marjanovic et al. |
| 2002/0170891 A1* | 11/2002 | Boyle .................... B23K 26/16 216/13 |
| 2013/0330515 A1* | 12/2013 | Oh ........................ C03C 17/322 428/156 |

(Continued)

FOREIGN PATENT DOCUMENTS

| CN | 102730956 A | 10/2012 |
| KR | 101225543 B1 | 1/2013 |

(Continued)

*Primary Examiner* — Binh X Tran
(74) *Attorney, Agent, or Firm* — CANTOR COLBURN LLP (57) ABSTRACT

A method of manufacturing a glass includes forming a first etch protection layer on a first surface of a glass substrate, and forming a second etch protection layer on a second surface of the glass substrate; removing a part of the first protection layer and a part of the second protection layer by applying a laser pulse penetrating the glass substrate from above the first surface of the glass substrate; forming a cut part in the glass substrate by etching the glass substrate using an etching solution; and removing the first etch protection layer and the second etch protection layer. The second surface is opposite to the first surface.

18 Claims, 11 Drawing Sheets

(56) References Cited

U.S. PATENT DOCUMENTS

2014/0147623 A1\* 5/2014 Shorey ..................... C23F 4/04
428/137
2015/0165548 A1 6/2015 Marjanovic et al.
2020/0407271 A1\* 12/2020 Ono ..................... F21V 3/0615

FOREIGN PATENT DOCUMENTS

| KR | 1020130056124 A | 5/2013 |
| KR | 1020180055734 A | 5/2018 |

\* cited by examiner

GLASS AND METHOD OF MANUFACTURING THE SAME

This application claims priority to Korean Patent Application No. 10-2020-0157805, filed on Nov. 23, 2020, and all the benefits accruing therefrom under 35 U.S.C. § 119, the content of which in its entirety is herein incorporated by reference.

BACKGROUND

Field

Embodiments described herein relate to a glass and a method of manufacturing a glass.

Background

A display device is a device emitting light to display an image. In the display device, a display part displaying the image may be protected by a glass. The glass may be formed by cutting a glass substrate to correspond to a shape of the display part.

SUMMARY

When the glass substrate is cut by dry etching (for example, laser cutting method), a cut part of the glass substrate may be damaged. Accordingly, a mechanical strength of the cut part may be lowered. And, an additional process to chamfer an edge of the cut part may be desirable.

Some embodiments provide a method of manufacturing a glass preventing a cut part of the glass from damaging and performing cutting of the glass and chamfering of an edge of the cut part in a single process.

Some embodiments provide a glass that an edge of a cut part is chamfered.

According to some embodiments of present invention concept, a method of manufacturing a glass may include: forming a first etch protection layer on a first surface of a glass substrate; forming a second etch protection layer on a second surface of the glass substrate; removing a part of the first protection layer and a part of the second protection layer by applying a laser pulse penetrating the glass substrate from above the first substrate of the glass substrate; forming a cut part in the glass substrate by etching the glass substrate using an etching solution; and removing the first etch protection layer and the second etch protection layer. The second surface is opposite to the first surface.

According to some embodiments, the part of the first etch protection layer may be removed by a first width by the laser pulse, and the part of the second etch protection layer may be removed by a second width by the laser pulse.

According to some embodiments, the method may further include adjusting a size of the first width and a size of the second width.

According to some embodiments, the size of the first width and the size of the second width may be adjusted based on an intensity of the laser pulse.

According to some embodiments, the size of the first width and the size of the second width may be adjusted based on a material of the first etch protection layer, a material of the second etch protection layer, and a wavelength of the laser pulse.

According to some embodiments, the wavelength of the laser pulse may be about 343 nanometers (nm) or more and about 355 nm or less.

According to some embodiments, the size of the first width may be greater than the size of the second width.

According to some embodiments, the size of the first width may be substantially the same as the size of the second width.

According to some embodiments, a shape of the cut part in a cross-section view may be adjusted based on the size of the first width and the size of the second width.

According to some embodiments, a transmittance of the glass substrate with respect to the laser pulse may be about 50 percentages (%) or more.

According to some embodiments, the glass substrate may further include a modified part modified by the laser pulse.

According to some embodiments, an etch rate of the modified part may be greater than an etch rate of a non-modified part of the glass substrate.

According to some embodiments, a shape of the cut part may be adjusted based on a width of the modified part.

According to some embodiments, the method may further include generating the laser pulse; and irradiating the glass substrate with the laser pulse through a laser scanning unit.

According to some embodiments, the laser scanning unit may include an f-theta lens.

According to some embodiments, forming the cut part in the glass substrate may include spraying the etching solution on the glass substrate.

According to some embodiments, forming the cut part in the glass substrate may further include dipping the glass substrate in the etching solution.

According to some embodiments, the etching solution may include at least one of hydrofluoric acid, hydrochloric acid, and ammonium fluoride.

According to some embodiments of the present inventive concept, a glass includes an upper surface, a lower surface opposite to the upper surface, and a side surface connecting the upper surface and the lower surface. The side surface includes a cut part. The cut part includes a first chamfered part and a second chamfered part. The first chamfered part is concave, has a first curvature radius, and is adjacent to the upper surface. The second chamfered part is concave, has a second curvature radius, and is adjacent to the lower surface. The second curvature radius is less than the first curvature radius.

According to some embodiments, the cut part may further include a flat part connecting the first chamfered part and the second chamfered part.

In the present inventive concept, after forming the protection layers on opposite major surfaces of the glass substrate, the etch protection layers may be removed with a laser pulse. Accordingly, the number of processes required for glass manufacturing may be effectively reduced.

In the present inventive concept, the glass substrate may be etched and cut with an etching solution, and at the same time, the edge of the cut part may be chamfered. Accordingly, damage to the cut part may be effectively prevented, and an additional process for chamfering may not be required.

BRIEF DESCRIPTION OF THE DRAWINGS

The accompanying drawings, which are included to provide a further understanding of the invention and are incorporated in and constitute a part of this specification, illustrate exemplary illustrative embodiments of the invention, and together with the description serve to explain the inventive concepts.

DETAILED DESCRIPTION

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Hereinafter, embodiments of the present invention will be explained in detail with reference to the accompanying drawings.

Figure 1:
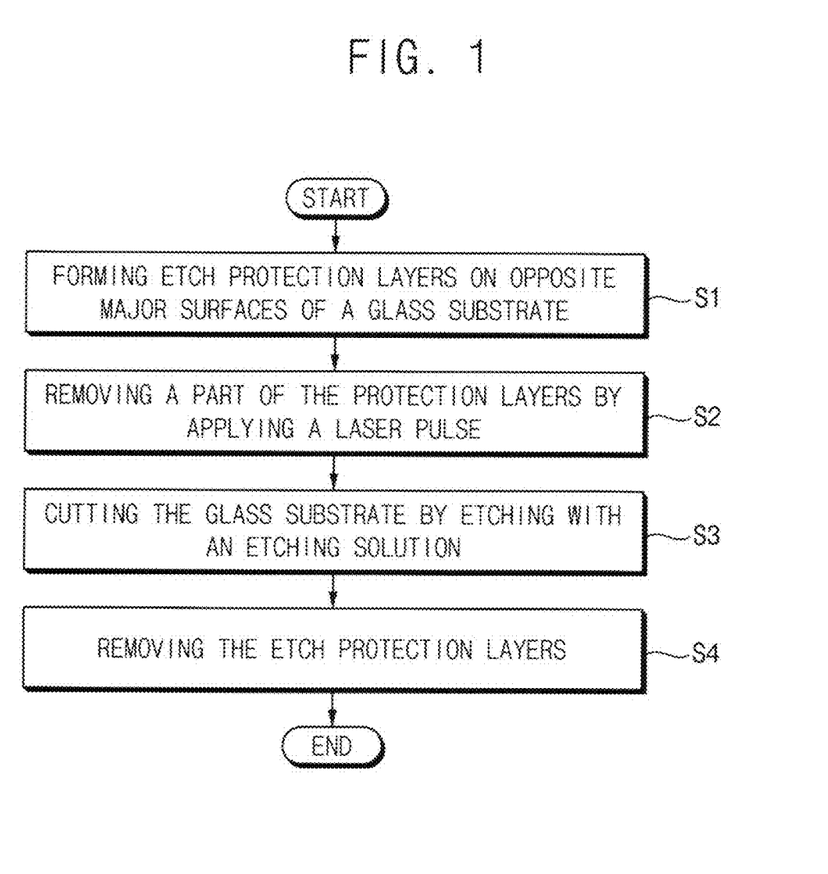
FIG. 1 is a flow chart showing a glass manufacturing method according to an embodiment.

FIG. 1 is a flow chart showing a glass manufacturing method according to an embodiment.

Referring to FIG. 1, a glass manufacturing method may include: forming etch protection layers on opposite major surfaces of a glass substrate (S1); removing a part of the protection layers by applying a laser pulse (S2); cutting the glass substrate by etching with an etching solution (S3); and removing the etch protection layers (S4).

FIG. 2, FIG. 3, FIG. 4, FIG. 5, and FIG. 6 are perspective view showing a glass manufacturing method according to an embodiment.

Figure 2:
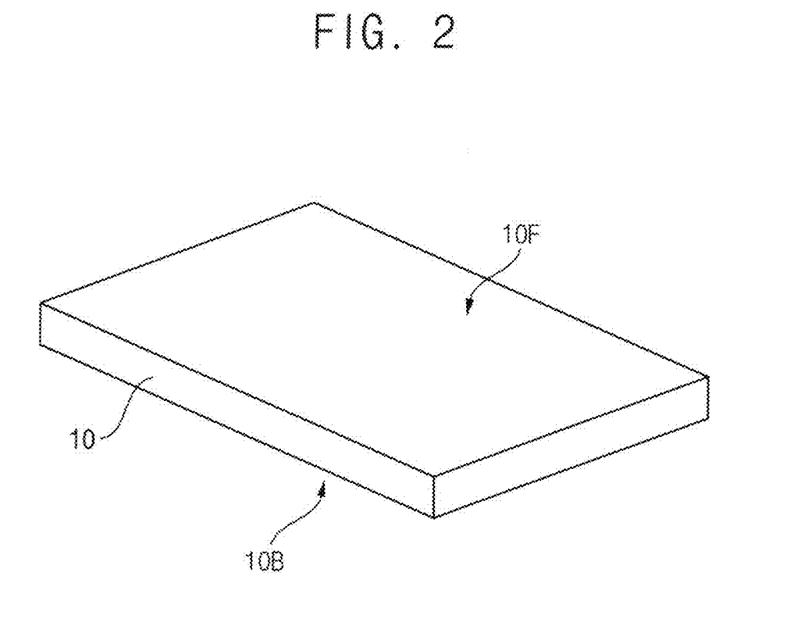
FIGS. 2, 3, 4, 5, and 6 are perspective view showing a glass manufacturing method according to an embodiment.

Referring to FIG. 2, a glass substrate 10 may be prepared. The glass substrate 10 may include a first surface 10F and a second surface 10B. The second surface 10B may be opposite to the first surface 10F. In FIG. 2, the glass substrate 10 having a rectangular shape is illustrated, but a shape of the glass substrate 10 according to the invention is not limited to the rectangular shape. In another embodiment, for examples, the shape of the glass substrate 10 may be a round shape. The glass substrate 10 may include soda-lime, alumoboro-silicate, earth alkali alumo-silicate, or earth alkali alumo-boro-silicate.

Figure 3:
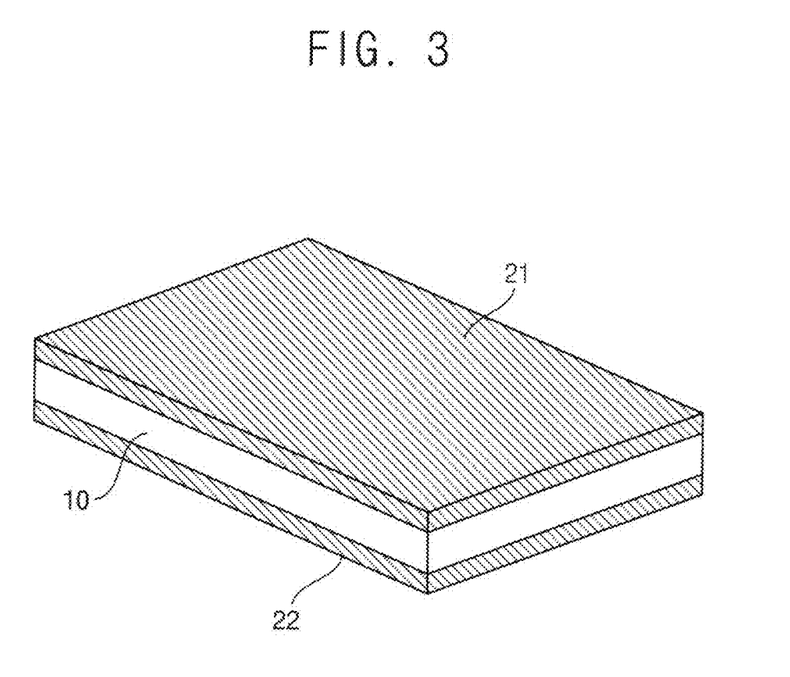

Referring to FIG. 1 and FIG. 3, etch of etch protection layers 21 and 22 may be formed on each of the opposite major surfaces 10F and 10B of the glass substrate 10 (S1). Specifically, a first etch protection layer 21 may be formed on the first surface 10F. A second etch protection layer 22 may be formed on the second surface 10B. The etch protection layers 21 and 22 may have a relatively low etch rate with respect to an etching solution. For example, with respect to the etching solution, the etch rate of the etch protection layers 21 and 22 may be lower than an etch rate of the glass substrate 10. The etch protection layers 21 and 22 may prevent the glass substrate 10 from contacting with the etching solution. The etch protection layer 21 and 22 may protect the glass substrate 10 from being etched.

Figure 4:
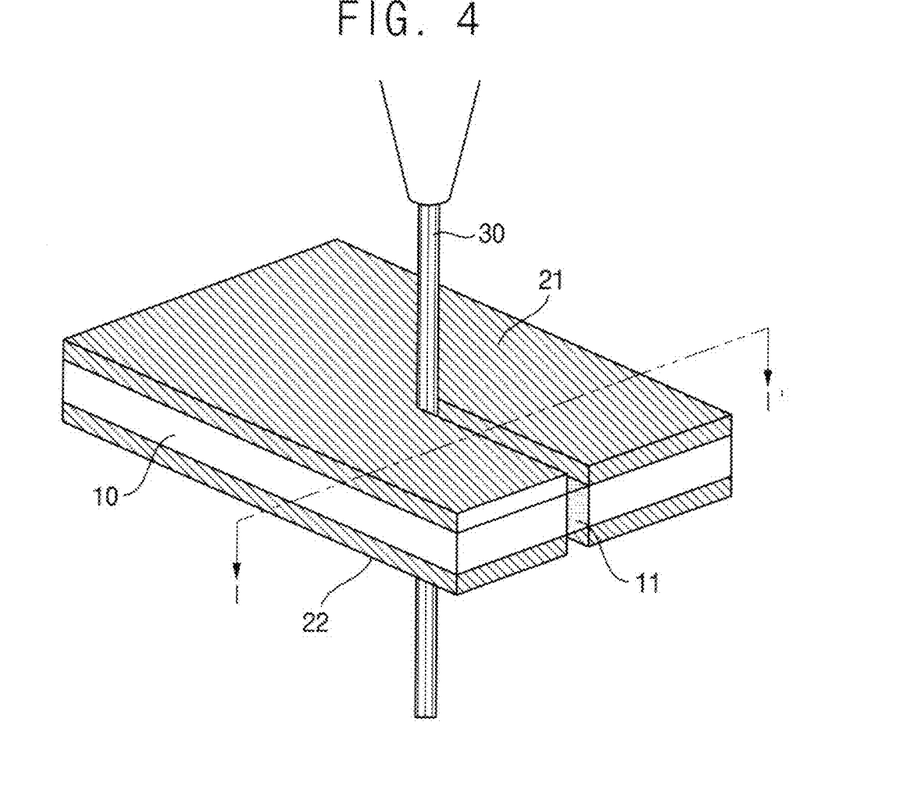

Referring to FIG. 1 and FIG. 4, a part of the etch protection layers 21 and 22 may be removed by laser pulse 30 (S2). Specifically, the laser pulse 30 may enter the glass substrate from above the first surface 10F of the glass substrate 10. Accordingly, the laser pulse 30 may remove the first etch protection layer 21 and then penetrate the glass substrate 10 to remove the second etch protection layer 22. A part of the first etch protection layer 21 and a part of the second etch protection layer 22 may be removed and then the first surface 10F and the second surface 10B of the glass substrate 10 may be exposed. The first etch protection layer 21 and the second etch protection layer 22 may include the same material.

The laser pulse 30 may have different intensity depending on location. A distribution of the intensity of the laser pulse 30 may be a Gaussian distribution. The intensity of the laser pulse 30 may be greatest at a center of the laser pulse 30. In an embodiment, the laser pulse 30 may include excimer laser pulse, YAG laser pulse, glass laser pulse, YV04 laser pulse, Ar laser pulse, ruby laser pulse, etc.

Each of the etch protection layers 21 and 22 may have an ablation threshold. When the laser pulse 30 having intensity equal to or greater than the ablation threshold is applied to each of the etch protection layers 21 and 22, the etch protection layers 21 and 22 may be removed.

In an embodiment, the etch protection layers 21 and 22 formed on the opposite major surfaces 10F, 10B of the glass substrate 10 may be removed at the same time by the laser pulse 30. Accordingly, the number of processes required for the glass manufacturing method may be reduced, and mass productivity may be increased.

The laser pulse 30 may penetrate the glass substrate 10. For example, some of the laser pulse 30 may be absorbed by the glass substrate 10 and some of the laser pulse 30 may penetrate the glass substrate 10. When the laser pulse 30 is perfectly absorbed by the glass substrate 10, the second etch protection layer 22 may not be etched. In an embodiment, a transmittance of the glass substrate 10 with respect to the laser pulse 30 may be about 50 percentages (%) or more.

The laser pulse 30 may be absorbed by the glass substrate 10, and the laser pulse 30 may modify the glass substrate 10. Accordingly, a part of the glass substrate 10 in which the laser pulse 30 is absorbed may become a modified part 11. Specifically, the laser pulse 30 may be inductively absorbed by the glass substrate 10, and form the modified part 11 on the glass substrate 10. An etch rate of the modified part 11 may be greater than an etch rate of a part of the glass substrate 10 that is not modified by the laser pulse 30.

Figure 5:
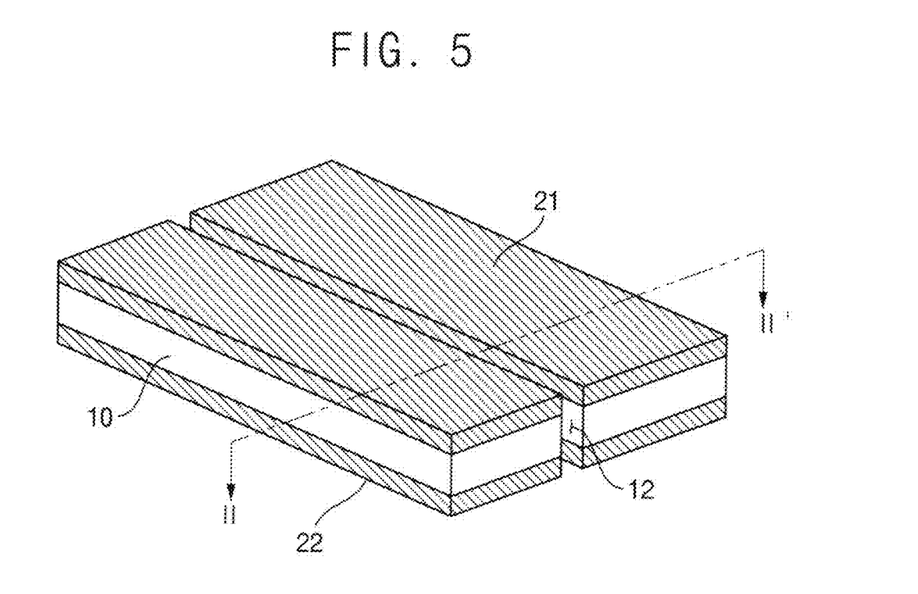

Referring to FIG. 1 and FIG. 5, a part of the glass substrate 10 may be removed by etching with an etching solution to form a cut part 12 (S3). Specifically, the glass substrate 10 may be etched by the etching solution. A part of the first surface 10F and the second surface 10B of the glass substrate 10 that is not protected by the etch protection layers 21 and 22 may be etched by contacting with the etching solution. An etch rate of the modified part 11 with respect to the etching solution may be relatively high, and thus, may be etched relatively quickly. A part of the glass substrate 10 that is etched and removed by the etching solution may form the cut part 12.

The etching solution may be sprayed on the opposite major surfaces 10F and 10B of the glass substrate 10, or the glass substrate 10 may be immersed in the etching solution. In an embodiment, the etching solution may include at least one of the hydrofluoric acid, hydrochloric acid, and ammonium fluoride.

The etch rate of each of the etch protection layers 21 and 22 with respect to the etching solution may be relatively low. That is, the etch rate of the etch protection layers 21 and 22 may be lower than an etch rate of the glass substrate 10 with respect to the etching solution. In an embodiment, the etch protection layers 21 and 22 may have acid resistance.

In the present inventive concept, since the glass substrate 10 is cut by wet etching method using the etching solution, damage to the cut part 12 of the glass substrate 10 may be effectively prevented. In addition, since the glass substrate 10 and the etching solution are in contact with each other through the removed part of the etch protection layers 21 and 22, the cut part 12 may have a shape in which the edges are chamfered.

Figure 6:
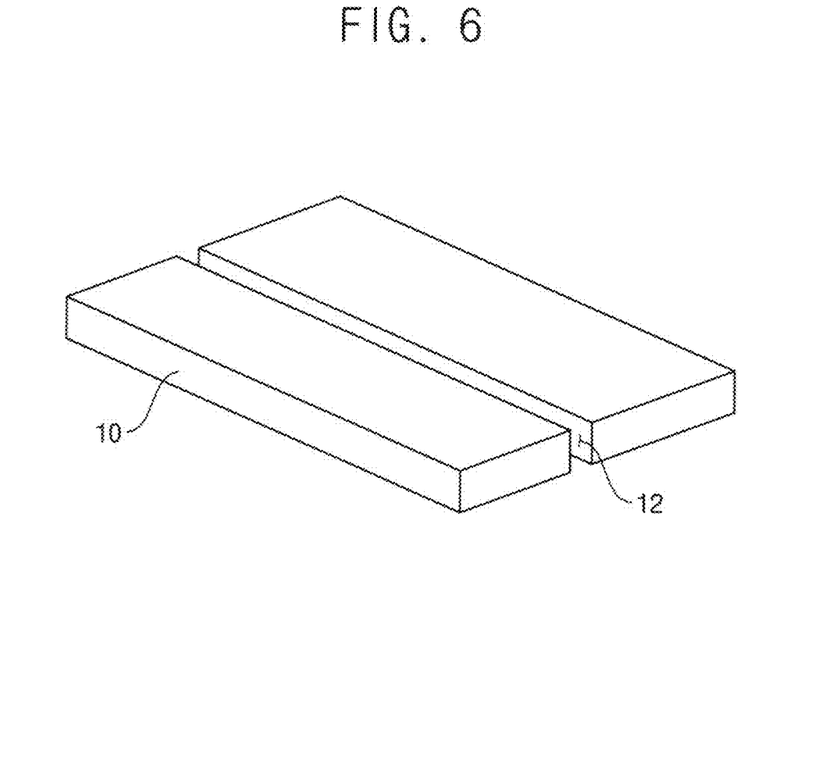

Referring to FIG. 1 and FIG. 6, the etch protection layers 21 and 22 may be removed (S4). So, the glass substrate 10 having the cut part 12 may be formed.

Figure 7:
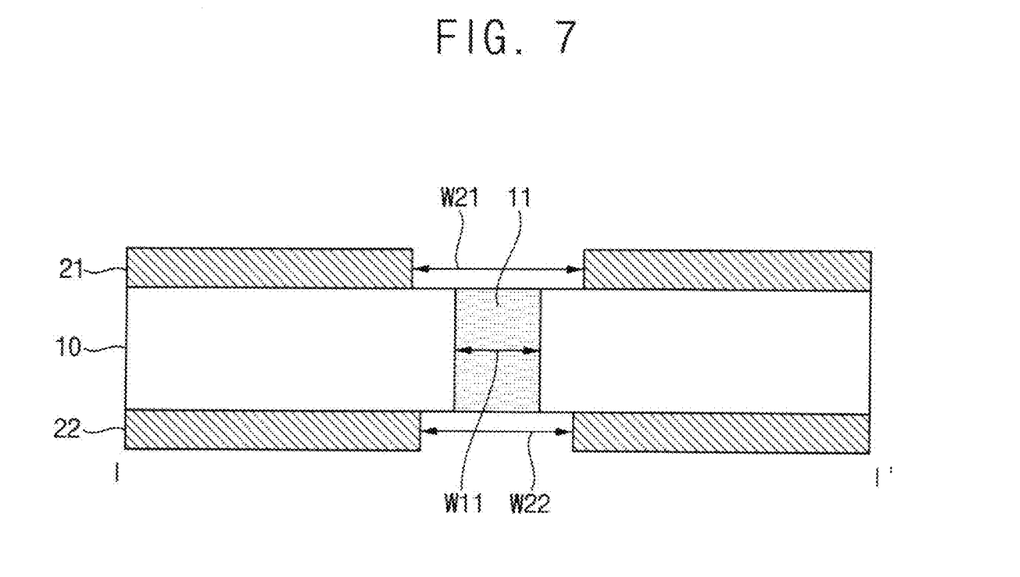
FIG. 7 is a cross-sectional view taken along line of FIG. 4.

FIG. 7 is a cross-sectional view taken along line I-I' of FIG. 4.

Referring to FIG. 4 and FIG. 7, A part of the first etch protection layer 21 may be removed by the laser pulse 30, and a width of a removed part of the first etch protection layer 21 on a major surface plane of the first etch protection layer 21 may be a first width W21. The major surface plane is defined by the first direction DR1 and a second direction DR2. (See FIG. 16). The second etch protection layer 22 may be removed by the laser pulse 30, and a width of a removed part of the second etch protection layer 21 on a major surface plane of the second etch protection layer 22 may be a second width W22. A width of the modified part 11 modified by the laser pulse 30 on a major surface plane of the glass substrate 10 may be a third width W11.

The first width W21 and the second width W22 may be adjusted. Specifically, a size of the first width W21 and a size of the second width W22 may be adjusted by adjusting an intensity of the laser pulse 30, a wavelength of the laser pulse 30, a material of the first etch protection layer 21, and a material of the second etch protection layer 22.

In an embodiment, the size of the first width W21 may be larger than the size of the second width W22, or the size of the first width W21 may be substantially same as the size of the second width W22.

Figure 8:
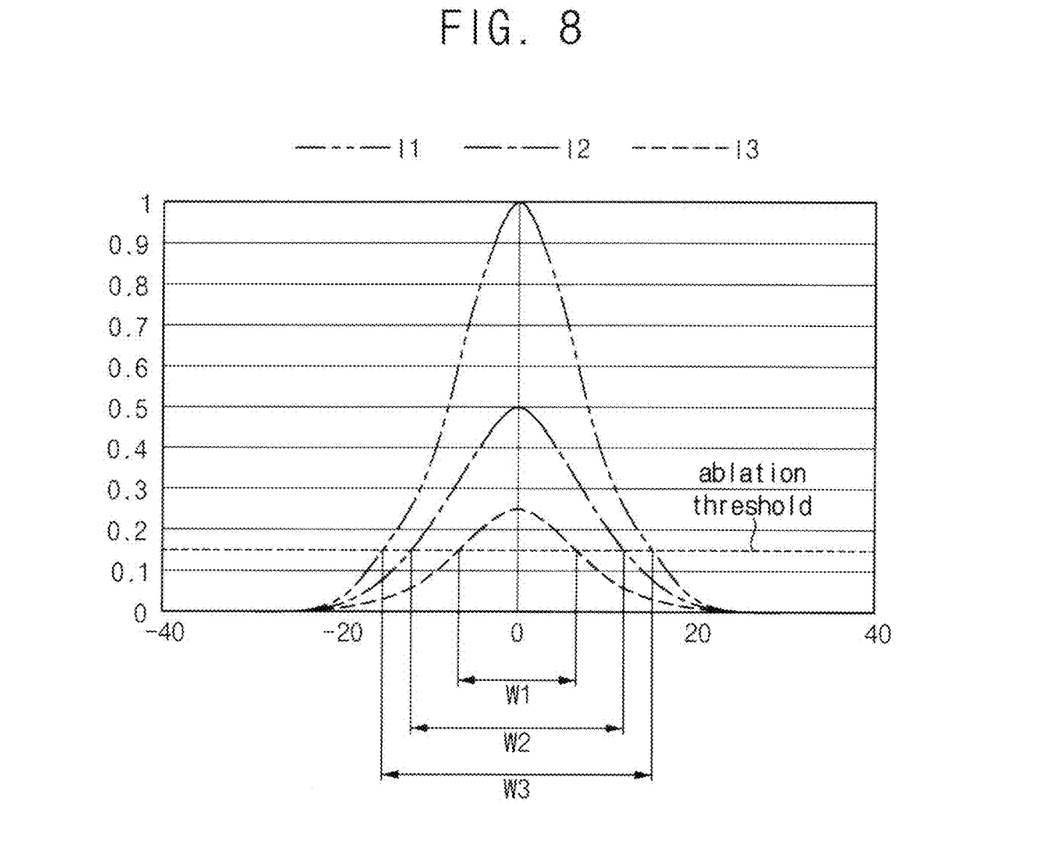
FIG. 8 is a graph for explaining a method of adjusting a size of a first width and a size of a second width of FIG. 7.

FIG. 8 is a graph for explaining a method of adjusting a size of a first width and a size of a second width of FIG. 7.

Referring to FIG. 7 and FIG. 8, a y-axis of the graph of FIG. 8 means relative intensity of the laser pulse 30, and an x-axis of the graph of FIG. 8 means location (micrometers (μm)). A distribution of an intensity of the laser pulse 30 may be a Gaussian distribution. The distribution of the intensity of laser pulse 30 may be a first distribution of intensity I1, a second distribution of intensity I2, or a third distribution of intensity I3. The graph of FIG. 8 sets maximum intensity of the first distribution of intensity I1 to 1, and the relative intensity distribution accordingly is shown. That is, maximum intensity of the second distribution of intensity I2 is 0.5, and maximum intensity of the third distribution of intensity I3 is 0.25. The etch protection layers 21 and 22 may have an ablation threshold. The etch protection layers 21 and 22 may not be etched by the laser pulse 30 having intensity that is lower than the ablation threshold. The etch protection layers 21 and 22 may be etched by the laser pulse 30 having intensity that is equal to or greater than the ablation threshold.

When the distribution of the intensity of the laser pulse 30 is the first distribution of intensity I1, a width by which the first etch protection layer 21 is removed and a width by which the second etch protection layer 22 is removed may each be a third width W3. When the distribution of the intensity of the laser pulse 30 is the second distribution of intensity I2, a width by which the first etch protection layer 21 is removed and a width by which the second etch protection layer 22 is removed may each be a second width W2. When the distribution of the intensity of the laser pulse 30 is the third distribution of intensity I3, a width by which the first etch protection layer 21 is removed and a width by which the second etch protection layer 22 is removed may each be a first width W1.

As described above, as the intensity of the laser pulse 30 is adjusted, the sizes of the first width W21 and the second width W22 may be adjusted.

Figure 9:
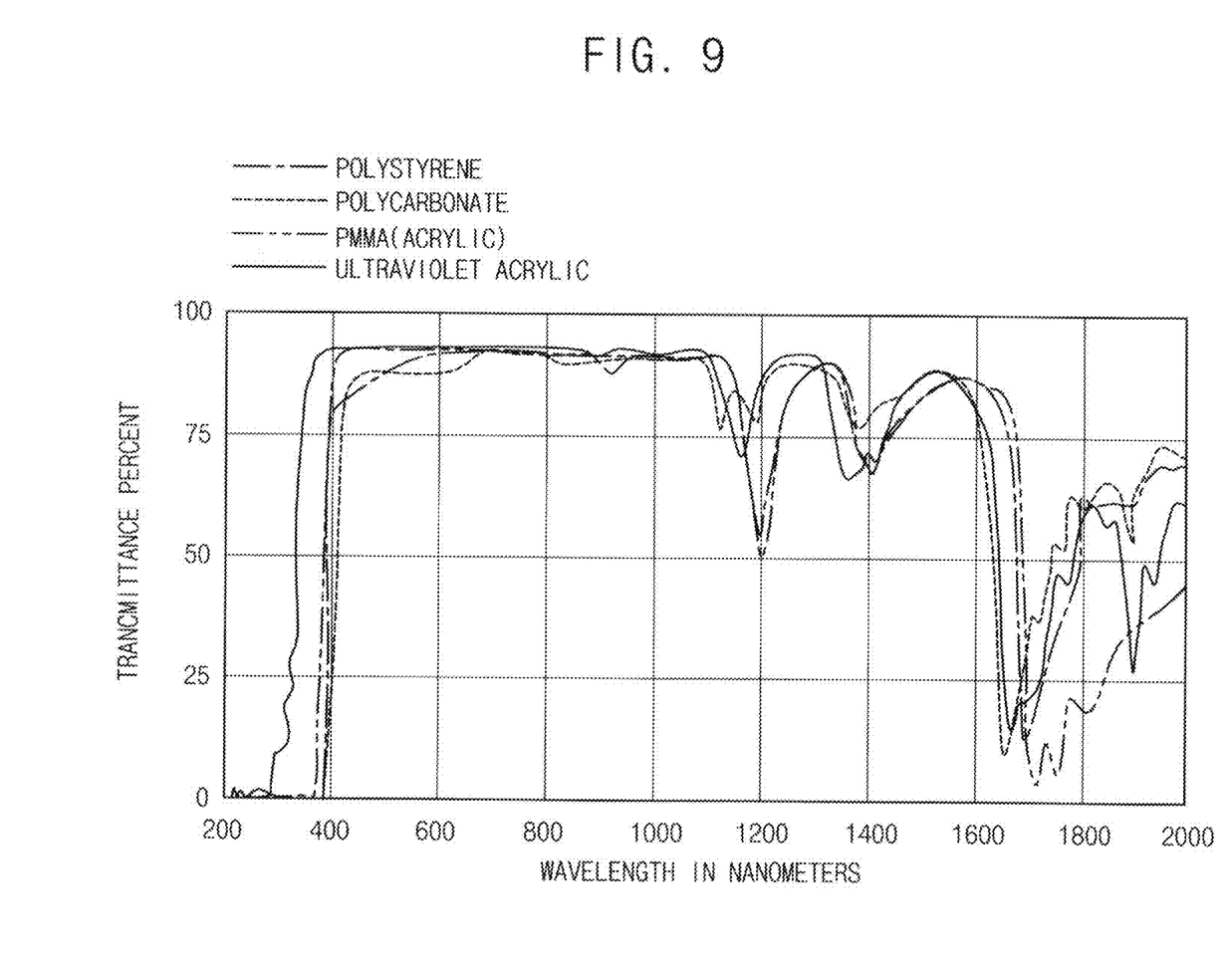
FIG. 9 is a graph for explaining a method of adjusting a size of a first width and a size of second width of FIG. 7.

FIG. 9 is a graph for explaining a method of adjusting a size of a first width and a size of second width of FIG. 7.

Referring to FIG. 7 and FIG. 9, the graph of FIG. 9 shows transmittance of the laser pulse penetrating each of the materials when the laser pulse 30 of different wavelengths are irradiated to different materials.

The etch protection layers 21 and 22 may include polystyrene, polycarbonate, Poly(methyl methacrylate) ("PMMA"), or ultraviolet acrylic, and each of the materials may have a different transmittance for the laser pulse 30 of a specific wavelength. When a transmittance of each of the first etch protection layer 21 and the second etch protection layer 22 is relatively high (for example, the transmittance is about 80%), an amount of the laser pulse 30 that is absorbed by the etch protection layers 21 and 22 may be relatively lowered. Accordingly, a process time for removing the etch protection layers 21 and 22 may be relatively long, and the size of the first width W21 and the size of the second width W22 may be relatively reduced.

In an embodiment, in order that the etch protection layers 21 and 22 can transmit the laser pulse 30 relatively less, a material of the first etch protection layer 21, a material of the first etch protection layer 22, and a wavelength of the laser pulse 30 may be adjusted.

In an embodiment, the wavelength of the laser pulse 30 may be about 343 nanometers (nm) or more and about 355 nm or less. When the wavelength of the laser pulse 30 may be about 343 nm or more and about 355 nm or less, the transmittance of the laser pulse 30 may be relatively low for most materials (for example, polystyrene, polycarbonate, and PMMA). So, by setting the wavelength of the laser pulse 30 to about 343 nm or more and about 355 nm or less, a rate of absorption of the laser pulse 30 for most materials may be relatively high.

Figure 10:
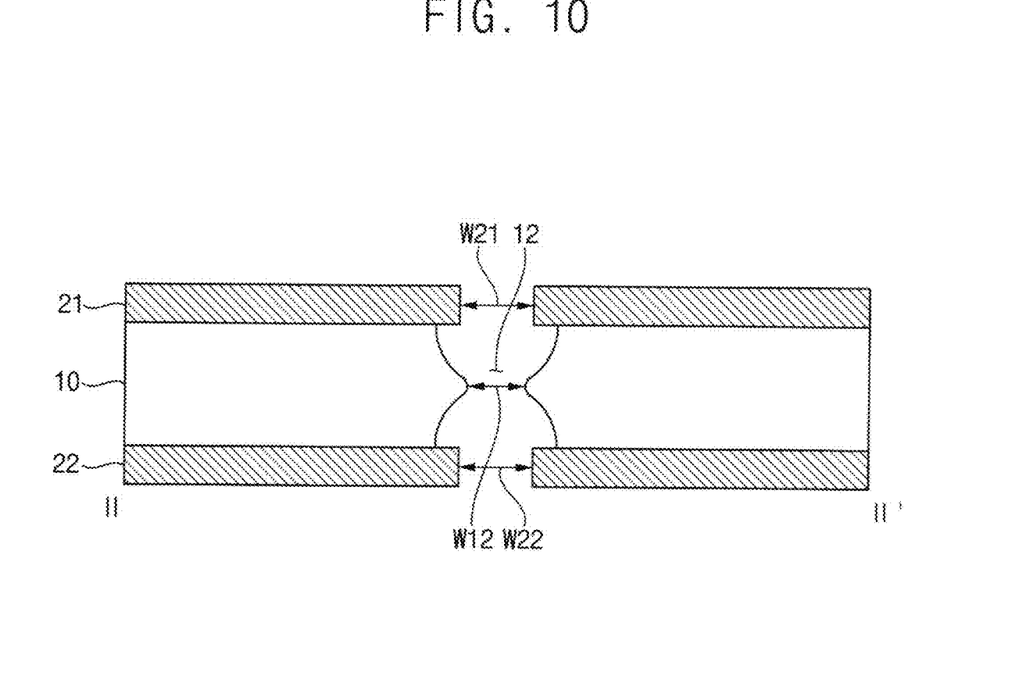
FIGS. 10, 11, and 12 are cross-sectional views taken along line II-II' of FIG. 5.
Figure 11:
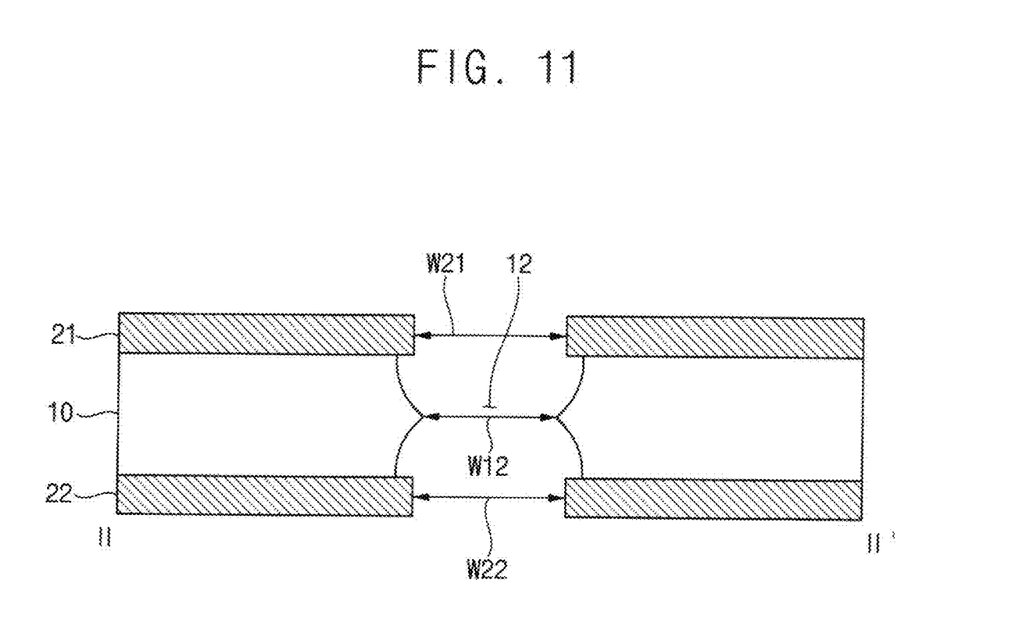
Figure 12:
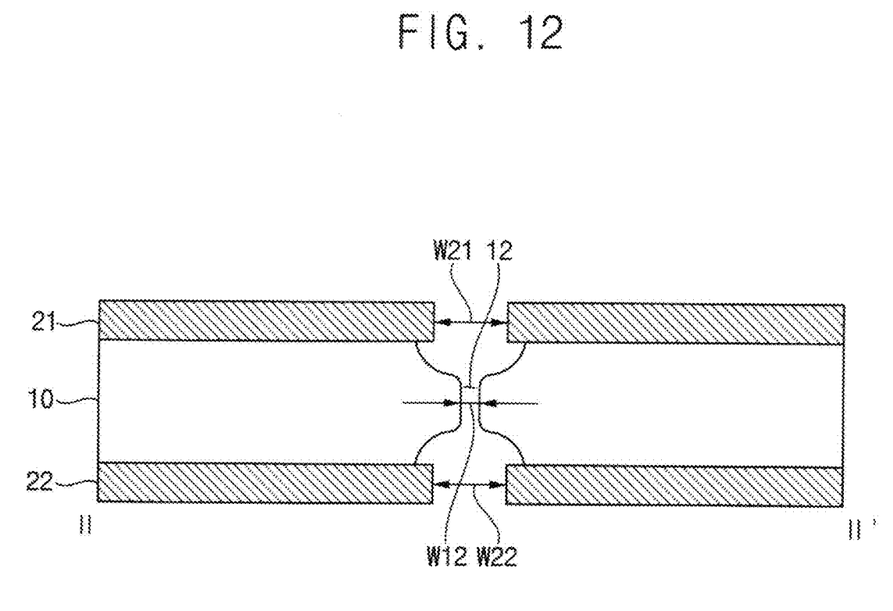

FIG. 10, FIG. 11, and FIG. 12 are cross-sectional views taken along line II-II' of FIG. 5.

Referring to FIG. 10, FIG. 11, and FIG. 12, a shape of the cut part 12 may be changed by adjusting the first width W21 and the second width W22. Specifically, when the size of the first width W21 is increased, a size of an upper part of the cut part 12 may be increased. And, when the size of the second width W22 is increased, a size of a lower part of the cut part 12 may be increased. In FIG. 10, FIG. 11, and FIG. 12, the size of the first width W21 may be substantially the same as the size of the second width W22. In other words, difference between the size of the first width W21 and the size of the second width W22 may be equal or less than 1% of the size of the second width W22. And, the shape of the cut part 12 may be changed by adjusting the size of the third width W11 of the modified part 11. Specifically, when the size of the third width W11 of the modified part 11 is increased, a width W12 of a middle part of the cut part 12 may be increased.

FIG. 10, FIG. 11, and FIG. 12 may illustrate the shape of the cut part 12 when a set of the first width W21, the second width W22, and the third width W11 of the modified part 11 is adjusted differently. FIG. 10 may illustrate the shape of the cut part 12 when the sizes of the first width W21 and the second width W22 each are about 8 μm, the size of the third width W11 of the modified part 11 is about 14 μm, and an etching time is about 200 seconds. FIG. 11 may illustrate the shape of the cut part 12 when the sizes of the first width W21 and the second width W22 each are about 20 μm, the size of the third width W11 of the modified part 11 is about 14 μm, and the etching time is about 200 seconds. FIG. 12 may illustrate the shape of the cut part 12 when the sizes of the first width W21 and the second width W22 each are about 6 μm, the size of the third width W11 of the modified part 11 is about 6 μm, and the etching time is about 200 seconds. Depending on these parameters, the width W12 of a middle part of the cut part 12 and the shape of the cut part 12 may be changed as shown in FIGS. 10 to 12.

Figure 13:
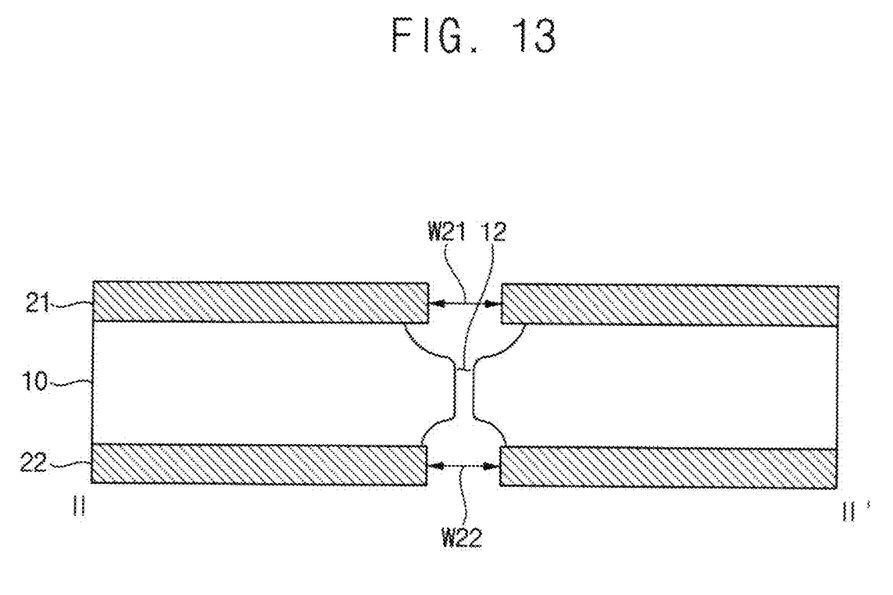
FIGS. 13 and 14 are cross-sectional views taken along line II-II' of FIG. 5.
Figure 14:
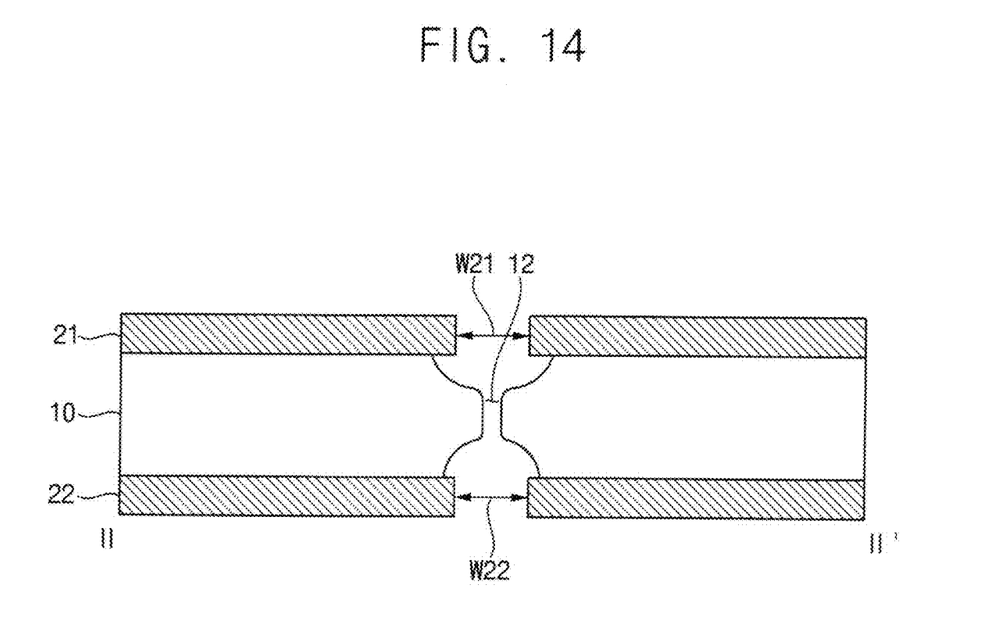

FIG. 13 and FIG. 14 are cross-sectional views taken along line II-II' of FIG. 5.

Referring to FIG. 13 and FIG. 14, the shape of the cut part 12 may be changed by the transmittance of the glass substrate 10 with respect to the laser pulse 30. FIG. 13 and FIG. 14 illustrate the shape of the cut part 12 when the transmittance of the glass substrate 10 is different. FIG. 13 illustrates that the transmittance of the glass substrate 10 is about 25%, and FIG. 14 illustrates that the transmittance of the glass substrate 10 is about 50%.

When the transmittance of the glass substrate 10 is relatively low (for example, the transmittance of the glass substrate 10 is about 25%), the glass substrate 10 absorbs relatively large amount of the laser pulse 30, and the second etch protection layer 22 may be removed relatively less. Accordingly, the size of the second width W22 may be smaller than the size of the first width W21, and the shape of the cut part 12 may be asymmetry between the upper part of the cut part 12 and the lower part of the cut part 12. In order that the cut part 12 does not have an asymmetric shape, the transmittance of the glass substrate 10 may be about 50% or more.

Figure 15:
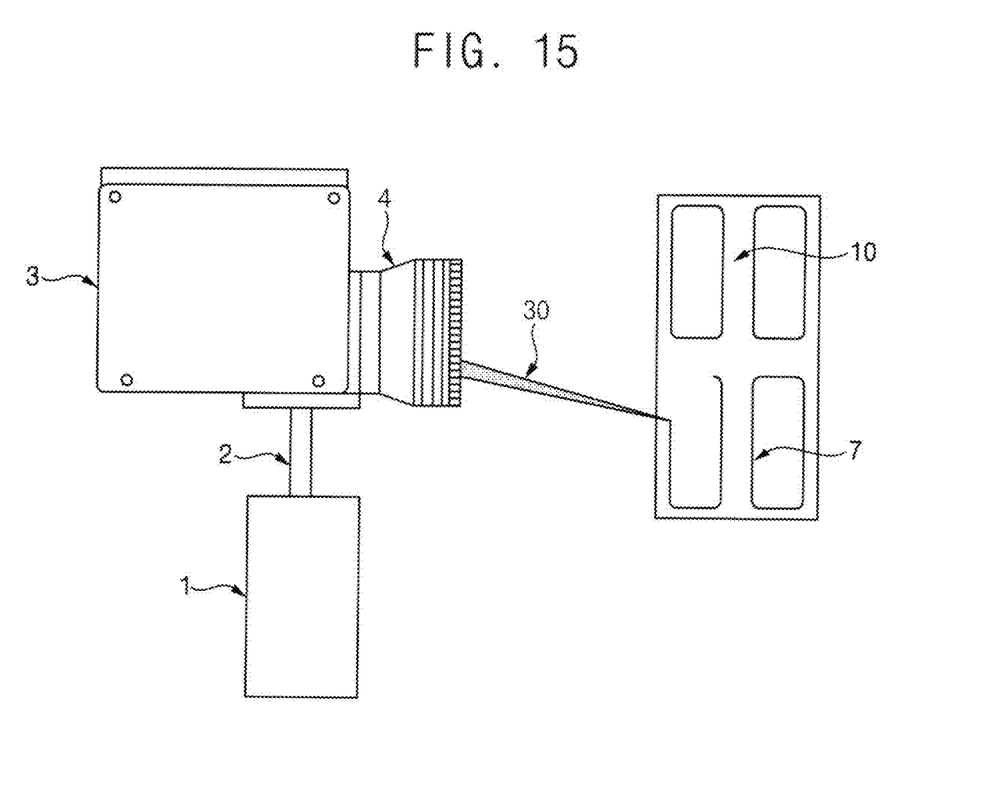
FIG. 15 is a diagram for explaining a laser pulse according to an embodiment.

FIG. 15 is a diagram for explaining a laser pulse according to an embodiment.

Referring to FIG. 15, the glass manufacturing method may further include following steps: generating a laser pulse 30; and irradiating the glass substrate 10 with the laser pulse 30 through a laser scanning unit 3.

The laser scanning unit 3 may include a plurality of mirrors, and may change a direction of a laser pulse 2 entering the laser scanning unit 3 from a laser generator 1. In an embodiment, the laser scanning unit 3 may further include an f-theta lens 4. The f-theta lens 4 may correct a focus of the laser pulse 30 when the laser pulse 30 is irradiated on the glass substrate 10.

Figure 16:
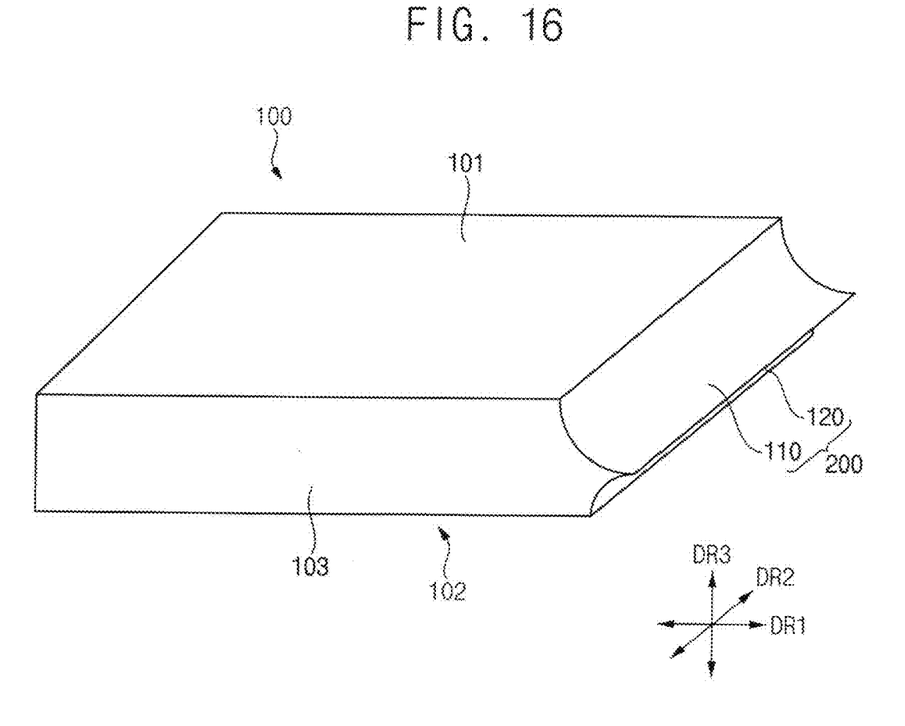
FIG. 16 is a perspective view showing a glass substrate according to an embodiment.

FIG. 16 is a perspective view showing a glass substrate according to an embodiment.

Referring to FIG. 16 a glass substrate 100 having a rectangular shape in a plan view is illustrated, but a shape of the glass substrate 100 according to the invention is not limited to the rectangular shape. For example, the shape of the glass substrate 100 may be a round shape. The glass substrate 100 may include an upper surface 101, a lower surface 102 opposite to the upper surface 101, and a side surface 103 connecting the upper surface 101 and the lower surface 102. The side surface 103 of the glass substrate 100 may include a cut part 200. The cut part 200 may include a first chamfered part 110 and a second chamfered part 120. The glass substrate 100 may include a cut part 200. The cut part 200 may be a surface cut by the method described with reference to FIGS. 1 to 15.

The glass substrate 100 may include soda-lime, alumoboro-silicate, earth alkali alumo-silicate, or earth alkali alumo-boro-silicate.

Figure 17:
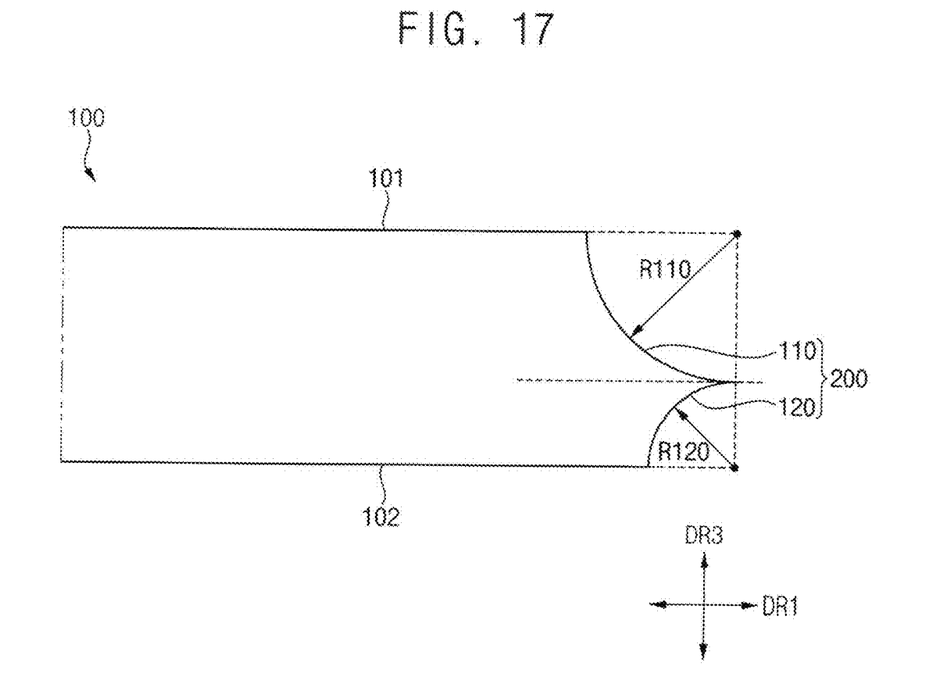
FIG. 17 is a cross-sectional view of the glass substrate of FIG. 16 taken along line in a first direction.

FIG. 17 is a cross-sectional view of the glass substrate of FIG. 16 taken along line extended in in a first direction DR1.

Referring to FIG. 17, the first chamfered part 110 may be adjacent to the upper surface 101. The second chamfered part 120 may be adjacent to the lower surface 102.

The first chamfered part 110 may have a curved surface. Specifically, the first chamfered part 110 may have a first curvature radius R110. The second chamfered part 120 may have a second curvature radius R120. The first curvature radius R110 may be larger than the second curvature radius R120.

Figure 18:
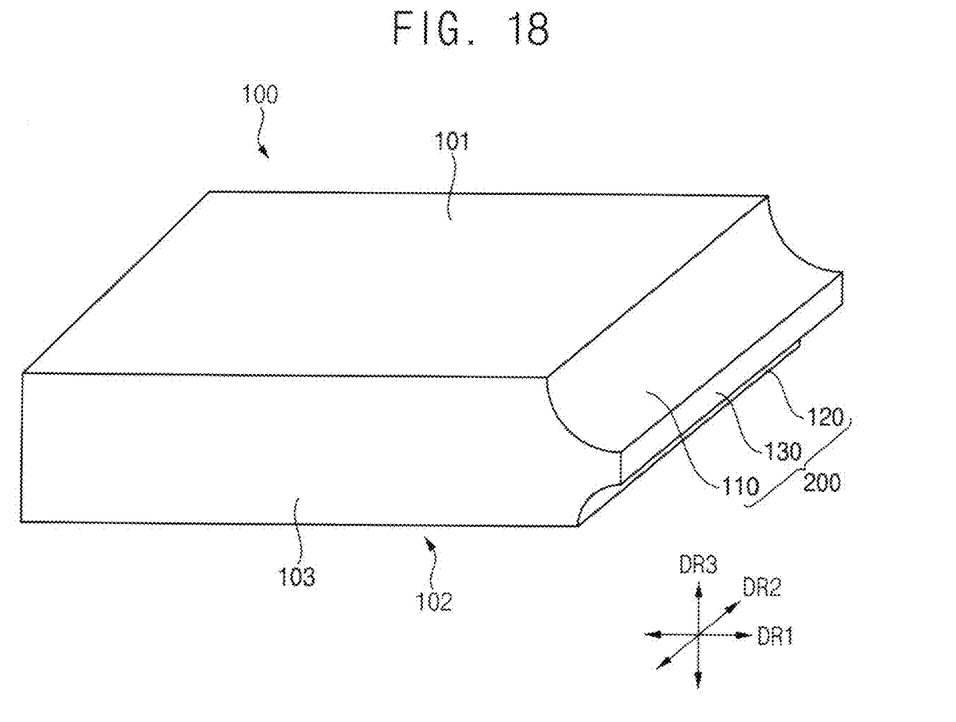
FIG. 18 is a perspective view showing a glass substrate according to another embodiment.

FIG. 18 is a perspective view showing a glass substrate according to another embodiment. A description overlapping with the glass substrate of FIG. 16 will be omitted.

Referring to FIG. 18, the side surface 103 may include a cut part 200. The cut part 200 may include a first chamfered part 110, a second chamfered part 120, and a flat part 130. The cut part 200 may be a surface cut by the method described with reference to FIGS. 1 to 15.

Figure 19:
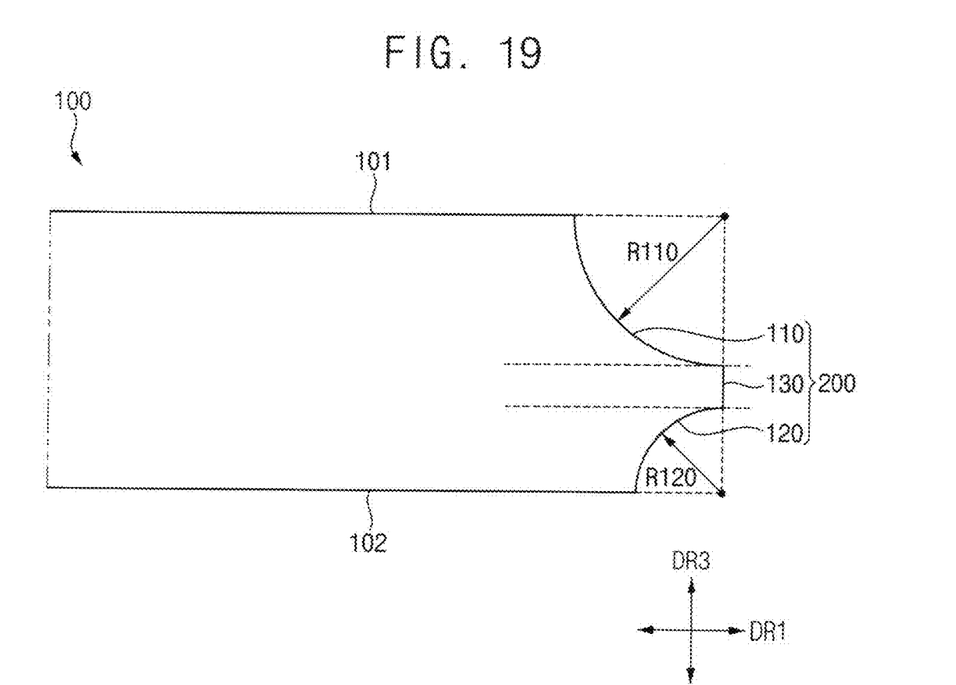
FIG. 19 is a cross-sectional view of the glass substrate of FIG. 18 taken along line in the first direction.

FIG. 19 is a cross-sectional view of the glass substrate of FIG. 18 taken along a line in the first direction DR1.

Referring to FIG. 19, the first chamfered part 110 may be adjacent to an upper surface 101. The second chamfered part 120 may be adjacent to a lower surface 102.

The first chamfered part 110 may have a curved surface. Specifically, the first chamfered part 110 may have a first curvature radius R110. The second chamfered part 120 may have a curved surface. Specifically, the second chamfered part 120 may have a second curvature radius R120. The flat part 130 may have a flat surface. The flat part 130 may be parallel to a plane defined by the second direction DR2 and a third direction DR3. (See FIG. 18) The flat part 130 may be disposed between the first chamfered part 110 and the second chamfered part 120. In other words, the flat part 130 may connect the first chamfered part 110 and the second chamfered part 120. The first curvature radius R110 may be larger than the second curvature radius R120.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of manufacturing a glass, the method comprising:
   forming a first etch protection layer on a first surface of a glass substrate;
   forming a second etch protection layer on a second surface of the glass substrate, wherein the second surface is opposite to the first surface;
   removing only a part of the first protection layer and a part of the second protection layer among the first and second protection layers and the glass substrate by applying a laser pulse penetrating the glass substrate from above the first surface of the glass substrate;
   forming a cut part in the glass substrate by etching the glass substrate using an etching solution; and
   removing the first etch protection layer and the second etch protection layer.

2. The method of claim 1, wherein the part of the first etch protection layer is removed by a first width by the laser pulse, and the part of the second etch protection layer is removed by a second width by the laser pulse.

3. The method of claim 2, further comprising:
   adjusting a size of the first width and a size of the second width.

4. The method of claim 3, wherein the size of the first width and the size of the second width are adjusted based on an intensity of the laser pulse.

5. The method of claim 3, wherein the size of the first width and the size of the second width are adjusted based on a material of the first etch protection layer, a material of the second etch protection layer, and a wavelength of the laser pulse.

6. The method of claim 5, wherein the wavelength of the laser pulse is about 343 nanometers (nm) or more and about 355 nm or less.

7. The method of claim 2, wherein the size of the first width is greater than the size of the second width.

8. The method of claim 2, wherein difference between the size of the first width and the size of the second width is equal to or less than 1% of the size of the second width.

9. The method of claim 2, wherein a shape of the cut part in a cross-sectional view is adjusted based on the size of the first width and the size of the second width.

10. The method of claim 1, wherein a transmittance of the glass substrate with respect to the laser pulse is about 50 percentages (%) or more.

11. The method of claim 1, wherein the glass substrate further comprises a modified part modified by the laser pulse.

12. The method of claim 11, wherein an etch rate of the modified part is greater than an etch rate of a non-modified part of the glass substrate.

13. The method of claim 11, wherein a shape of the cut part is adjusted based on a width of the modified part.

14. The method of claim 1, further comprising:
   generating the laser pulse; and
   irradiating the glass substrate with the laser pulse through a laser scanning unit.

15. The method of claim 14, wherein the laser scanning unit comprises an f-theta lens.

16. The method of claim 1, wherein forming the cut part in the glass substrate comprises spraying the etching solution on the glass substrate.

17. The method of claim 1, wherein forming the cut part in the glass substrate comprises dipping the glass substrate in the etching solution.

18. The method of claim 1, wherein the etching solution comprises at least one of hydrofluoric acid, hydrochloric acid, and ammonium fluoride.

* * * * *